United States Patent [19]

Murphy

[11] Patent Number: 4,524,812

[45] Date of Patent: Jun. 25, 1985

[54] MODULATED FORMING MACHINE

[76] Inventor: Peter H. Murphy, 7031 Glendora, El Paso, Tex. 79912

[21] Appl. No.: 427,701

[22] Filed: Sep. 29, 1982

Related U.S. Application Data

[63] Continuation-in-part of Ser. No. 407,094, Aug. 11, 1982, abandoned.

[51] Int. Cl.³ ............................ B23B 5/18; B27C 5/02
[52] U.S. Cl. .................................. 144/134 A; 144/356; 83/72; 83/477.2; 409/148; 409/183; 318/39
[58] Field of Search ............... 83/72, 74, 471.2, 477.2; 144/144 A, 134 A, 134 C, 136 R, 356; 409/148, 183; 408/11; 318/39

[56] References Cited

U.S. PATENT DOCUMENTS

| | | | |
|---|---|---|---|
| 1,825,104 | 9/1931 | Staeheli | 83/471.2 |
| 2,851,071 | 9/1958 | Schils | 144/144 R |
| 2,989,674 | 6/1961 | Hawkins et al. | 83/72 X |
| 3,315,554 | 4/1967 | Jaegers | 83/488 |
| 3,571,834 | 3/1971 | Mathias | 408/11 X |
| 3,592,094 | 7/1971 | Greenblatt | 83/72 |
| 3,653,113 | 4/1972 | Marvosh | 144/144 A |
| 3,789,279 | 1/1974 | Dempsy | 83/72 X |
| 4,133,237 | 1/1979 | Lewin | 83/477.2 X |
| 4,346,444 | 8/1982 | Schneider | 408/11 X |
| 4,351,029 | 9/1982 | Maxey | 408/11 X |

Primary Examiner—James M. Meister
Attorney, Agent, or Firm—John P. Murphy

[57] ABSTRACT

A material forming machine comprising a forming tool driven by a forming tool motor, a workpiece, a feed drive motor, a sensor, and a reference signal, wherein said sensor varies the speed of the feed drive motor by responding to variations of the speed of the forming tool's motion, and wherein the reference signal remains constant. Said machine performs sawing, shaping, milling, drilling, hammering, shearing, chiseling, and cutting on irregularly shaped workpieces, having variations in density.

6 Claims, 9 Drawing Figures

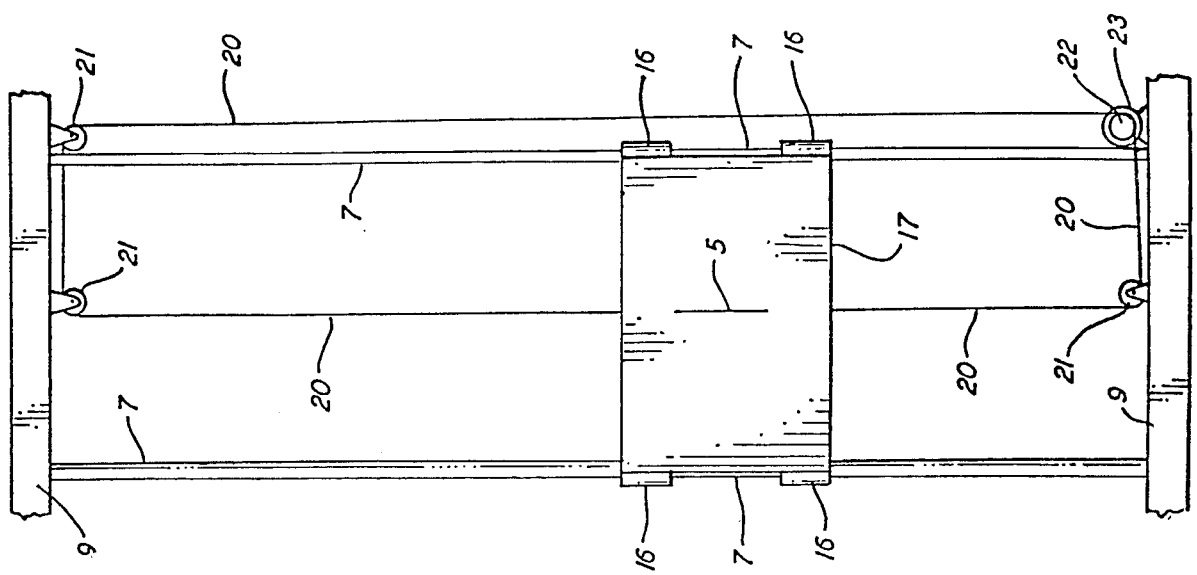
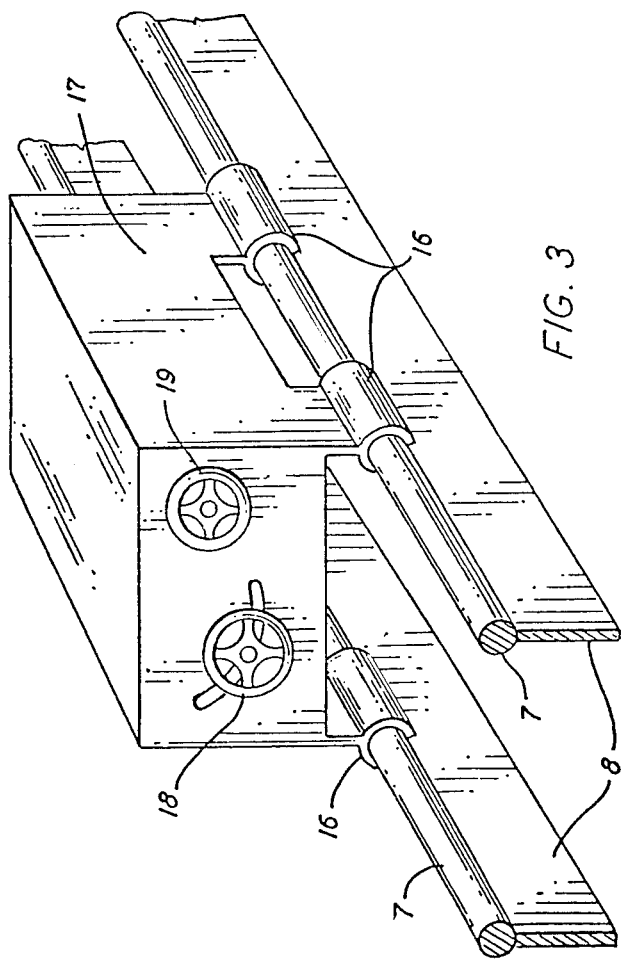
FIG. 4
FIG. 3

MODULATED FORMING MACHINE

This is a continuation in part of the application for Modulated Lineal Path Cutter filed Aug. 11, 1982, numbered Ser. No. 407,094 by Peter H. Murphy, now abandoned.

BACKGROUND OF INVENTION (1) Field of the Invention

This invention relates to any object that would require lineal (but not necessarily straight) forming whereby the forming process involves resistance being met by the forming tool during the forming operation on a workpiece such as sawing, routing, milling, drilling, shaping, or hammering, whether the forming motion of the forming tool is rotary, e.g. drilling, essentially linear, e.g. reciprocating saws, or linear-in-part, e.g. powered shears. This invention provides unique method of modulating the progression of the forming operation and a unique structure to lineally guide the formation operation either by guiding the forming tool into a workpiece or guiding the workpiece into the forming tool so that the workpiece can be safely and precisely formed without excessive damage to the workpiece with efficient use of the forming tool.

(2) Description of the Prior Art

Heretofore, material forming machines have either required the use of skilled and experienced operators to monitor and manually control the progression of the forming operation or used predetermined rates of progression of the forming operation that the operator judges best to approximate the optimum rate given the workpiece to be formed. Inasmuch as forming operations embrace a wide field of machining operations, the description of prior art will discuss rotary chip formation operations first.

Heretofore, cutters in which a rotary cutterhead require an operator to force the object across the table against an aligning device or fence using manual skill to vary the speed of the cut to prevent damage to the motor, drive train, cutting tips or edges, and the object to be cut.

A common example is a conventional wood table saw. The accuracy of the cut is no better than the trueness of the edge that is forced to ride against the aligning fence. Further, unless the operator is highly skilled at imparting a perfectly linear motion to the wood, the object may bind on the fence and correspondently bind at the saw blade causing the object to be imperfectly cut and worse, hurling the workpiece into the body of the operator. Although guards have been developed for the blade, the users of table saws often either wholly discard the guards or frequently do not operate them in place because the guards tend to bind the workpiece. Therefore the operators are endangered, because their hands pass by the exposed revolving blade and saw chips spray into their face from the blade that revolves toward the operator. Moreover, unless the operator is highly skilled, the wood object is not fed into the moving blade at a proper rate. If fed too fast, the motor is stalled and the saw may be damaged or the object is bitten into by the blade and thrown back into the operator. On the other hand, if fed too slowly, the chips taken out by the saw cutting tips gets so small that each tip does not bite, but rather skates or rides over the terminal surface of the cut allowing the saw blade to revolve at a high rate. Such cutting is not efficient, for saw blades are designed by rake, sharpness, and clearance angles and width of their teeth to efficiently operate in an optimum range of revolutions per minute in a given material. Moreover, such cutting may result in a damaged cut. The skating and resulting frictional heat produced along the sides and tops of the cutting tips results in a surface that is glazed, the wood cell structure bent over and crushed instead of cut, and the surface chemically altered by heating. This defect is also compounded by the workpiece binding at the fence or an operator pausing in feeding, usually causing a scorched band across the sawn surface. Such glazed surfaces are not acceptable for gluing, nor acceptable for application of a finish. Conventional table saws have had to be operated by expert operators. Moreover, conventional table saws require a high powered motor capable of delivering a relatively constant high RPM to overcome deviations from optimum rate of feed.

Another common example of prior art is a conventional table router in which the router bit protrudes upward and through a table's work surface with a fence or other aligning device on the top of the table. Again, the accuracy of the rout depends upon the trueness of the edge forced to ride the fence, and unless the operator is skilled in feeding against a fence, the workpiece binds and chatters resulting in distortion in the definition of the rout and chipped or torn woodgrain. Further, by too slow feeding, the wood surface may be scorched and skated upon and thus both chemically and physically deteriorated making the workpiece difficult to glue or finish properly. Similar to the table's saw blade, router bits are angularly and by the length of cutting edge designed to operate in an optimum range of revolutions per minute in a given material. By too slow feeding, the router bit revolves at an excessive rate resulting in inefficient cutting.

The same problems pertain to the use of conventional shaper, drilling, and milling machines. One of those problems being the necessity of expensive high powered motors delivering a constant high RPM to overcome deviations from optimum rate of feeding.

A workpiece of wood frequently contains hidden pockets of resin, hidden knots, and areas of interlocked and swirling grain and is generally of non-uniform density thus complicating the proper rate of feed, frustrating even a skilled craftsman. The edge forced to ride against a fence is often warped or out of true. Irregularly shaped workpieces requiring varying depths of cut of any material also complicate the proper rate of feed. Plastic and fiber build up material by variations of fiber structure present the same problem as wood to modulate the progression of cut.

The cutting, milling, and drilling of metal shares these problems. Instead of being scorched, metal becomes work hardened in the path of the cutter when the cutting edges are rotated at an excessive rate, for the skating or riding of the cutting edge produces excessive frictional heat.

Other forming operations that do not involve chip formation, nor involve rotary forming motion of the forming tool, such as powered shearing of sheet metal, heretofore, required the judgment of experienced operators to modulate the progression of the forming operation through workpieces of varying thickness. The same is true for other resistant forming operations where varying depths of the forming operation are sought with powered chisels or powered hammers. In these instances, if the rate of feed of the workpiece is excessive the forming tool motor slows as a result of the forming tool's motion being slowed by the resistance the tool meets in the forming operation and potentially damage results either to the machine or the workpiece. Heretofore, the machines utilized large and expensive forming tool motors and skilled operators to compensate and adjust for variances from optimum speed of feed.

SUMMARY

As contrasted with the prior art described above, the present invention provides a modulated forming machine that is unique in its structure and operation in that it is safer to use because the forming tool moves away from the operator instead of the operator being required to manually force the object to be cut, routed, milled, drilled, shaped or formed into the forming tool and allows for precise and undamaged formed surface.

One object of the present invention is to provide means to produce a modulated rate of progression of the forming operation so that the quality and definition of forming operation and resulting workpiece surface is excellent and further the hammer surface, edges, blades, router bits, milling bits, drill bits, or shaper knives (whatever the forming tool) are used to maximum efficiency by proper progression of forming operation through workpieces of varying density or irregular shapes.

Another object of the present invention is to provide a means to produce a modulated rate of progression of the forming operation so that the forming tool motor can be efficiently utilized allowing the use of less expensive tool motors.

Another object to the present invention is to provide a faster and more precise means for laying out and aligning the workpiece or workpieces with the fixed path of the forming operation.

Another object of the present invention is to provide modulated forming machines with either an easily manually controlled rate of approach of the forming tool and workpiece and automatically modulated progression of the forming operation to insure that the quality of forming operation and resulting surface is excellent and further the forming tool is utilized to maximum efficiency by an inexperienced operator.

Another object of the present invention is to provide a modulated forming machine in which the tool safely moves at a distance from the operator and does not require the operator to manually force the object to be cut or otherwise formed into the forming tool thereby exposing the operator to harm.

In achieving the above objects, there is provided means to modulate the rate of the forming operation by controlling the rate of lineal progression of the forming operation through the workpiece. The controller that modulates the rate of the forming operation is comprised of a sensor that senses the rate of forming motion of the forming tool and the resulting signal employed to command a feed drive motor that imparts the lineal motion of the forming tool through the path of the forming operation in the workpiece. Further provided are means to control the lineal approach of the forming tool and the workpiece to prevent unnesessary damage to the workpiece upon initial contact with the forming tool. The means to control the lineal approach is comprised of an adjustable speed control device. Further provided are means to switch from approach control and modulated progression of the forming operation.

To further realize the above objects there is provided a work holder with means to hold workpieces to be cut or formed and a lineal way, lineal ways, or a lineal way and articulating arm upon which either the forming tool is mounted and guided in a path fixed in relationship to the workpieces while lineally approaching the workpiece and progressing through the forming operation, or upon which the workholder is mounted and guided in a path fixed in relationship to the forming tool while the workholder and workpieces lineally approach the tool and progress through the forming operation.

BRIEF DESCRIPTION OF THE DRAWINGS

FIG. 3 is a fragmentary perspective view, wherein various portions are broken away to facilitate the disclosure, indicating a carriage slaved to lineal ways by linear ball bushings.

FIG. 4 is a fragmentary top view similar to FIG. 3 particularly showing the drive mechanism of the saw.

DESCRIPTION OF THE PREFERRED EMBODIMENTS

Figure 1:
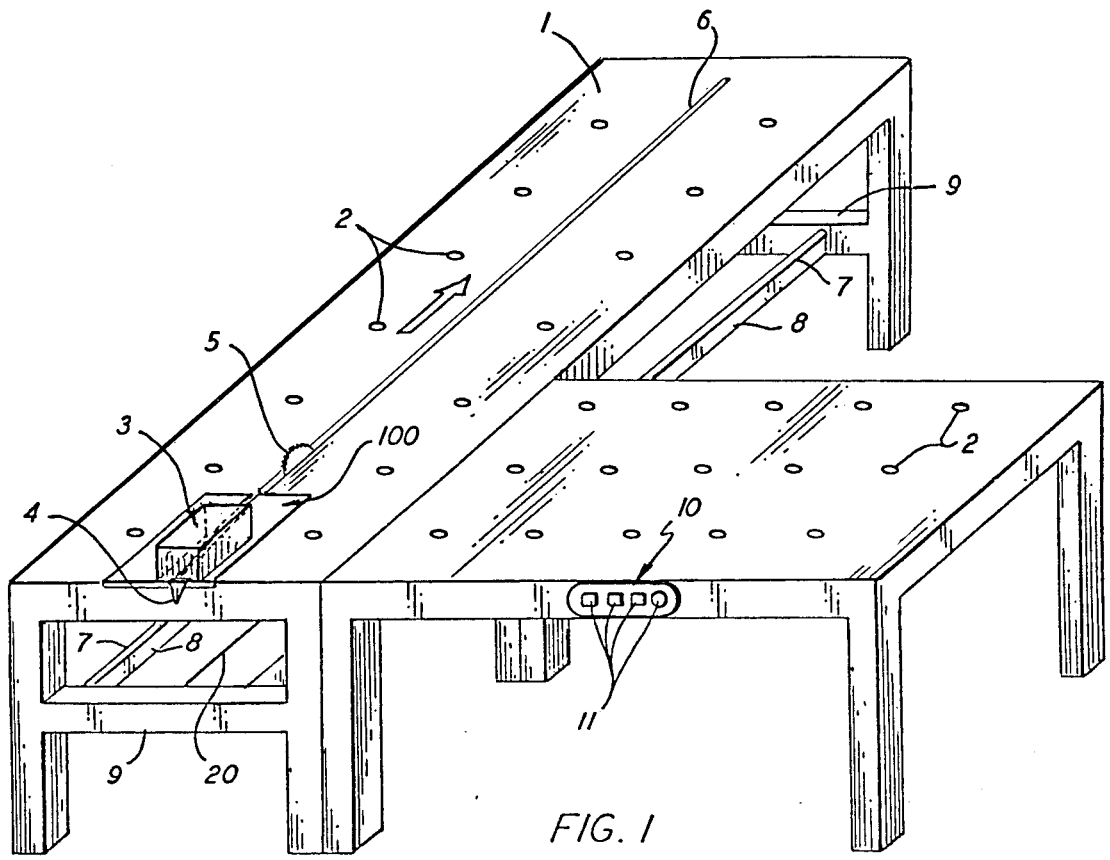
FIG. 1 is a perspective view showing a general view of one of the preferred embodiments, a table saw.

Referring to the drawings in detail, FIG. 1 shows a table saw comprised of an L-shaped table (1) with holes (2) arrayed in the top of table through which hold down clamps (more particularly shown in FIG. 2) pass through. The combination of table surface and clamp comprise a work holder. A clear plastic guard (3) is attached to the table (1) by a hinge (4) and shields the blade (5) in its initial position. The guard is hinged to permit the removal of plates (100) so the blade (5) can be changed. The clear plastic guard is open on the end so that the saw blade (5) can travel down slot (6) as it progresses in the direction of the arrow to make a cut. The saw carriage (not shown in FIG. 1) is mounted underneath the top of the table on the cylindrical lineal ways (7) supported on rails (8) attached to lateral frame members (9), as more particularly shown in FIG. 3. A cable (20) that is used to pull the saw carriage is stretched between pulleys as more particularly illustrated in FIG. 4. A control panel (10) with switches (11) is positioned away from the path of the cut which is in the proximity of the slot (6) and directed (as shown by arrow) away from the operator positioned by the control panel (10).

Figure 2:
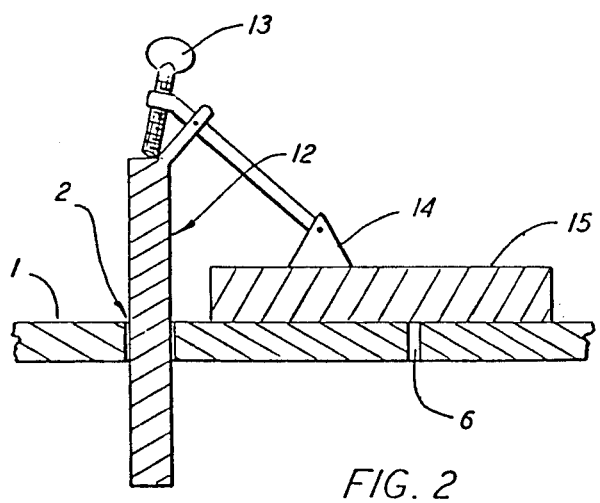
FIG. 2 is a fragmentary detail showing side view of a hold down clamp securing a workpiece on the table, the workpiece and table being shown in a vertical transverse section.

FIG. 2 shows the hold down clamp passing through the hole (2) in table (1) and the clamp's shaft (12) frictionally held by the sides of hole (2) as knob (13) is turned to secure workpiece (15) to table (1) over the slot (6). As knob (13) is turned, pod (14) is forced downward on workpiece (15) securing and positioning it to the work surface. The holes (2) in table (1) are so arrayed that it is impossible for the blade (5) to touch any part of any hold down clamp, whatever the shape of workpiece (15). The holes (2) are also arrayed over the L-shaped table (1) so that a workpiece or workpieces may be easily and quickly aligned with the path of cut by being secured by one or more hold down clamps.

FIG. 3 shows the saw carriage (17) slaved to the cylindrical ways (7) by linear ball bushings (16). The bushings (16) partially encircle the ways (7) allowing for linear motion when rails (8) are beneath way (7). The cylindrical ways (7) are supported by the V-cut support rails (8). The combination provides an accurate guide action to the saw carriage (17) and thus assures a dimensionally accurate cut by saw blade (5) which is mounted in carriage (17) by means (not shown, as it is conventional) that provide conventional height and tilt adjustment of the blade (5) by manually turning wheels (18) and (19).

FIG. 4 is a top view of carriage (17) with the table top cut away so the drive system may be better illustrated. The carriage (17) is shown only with saw blade (5) in place and is slaved by linear ball bearings (16) to ways (7). The ways (7) are attached to lateral frame members (9) to which idler pulleys (21), lineal drive motor (23) with drive pulley (22) mounted on the shaft of the lineal drive motor (23). Cable (20) is attached to the carriage (17) and passes through idle pulleys (21) to be driven by motor (23) and the drive pulley (22). The drive system parts are arranged to deliver a progressive saw cut into a workpiece secured on top of the table and then return the carriage to battery, i.e., to its initial starting position.

Figure 5:
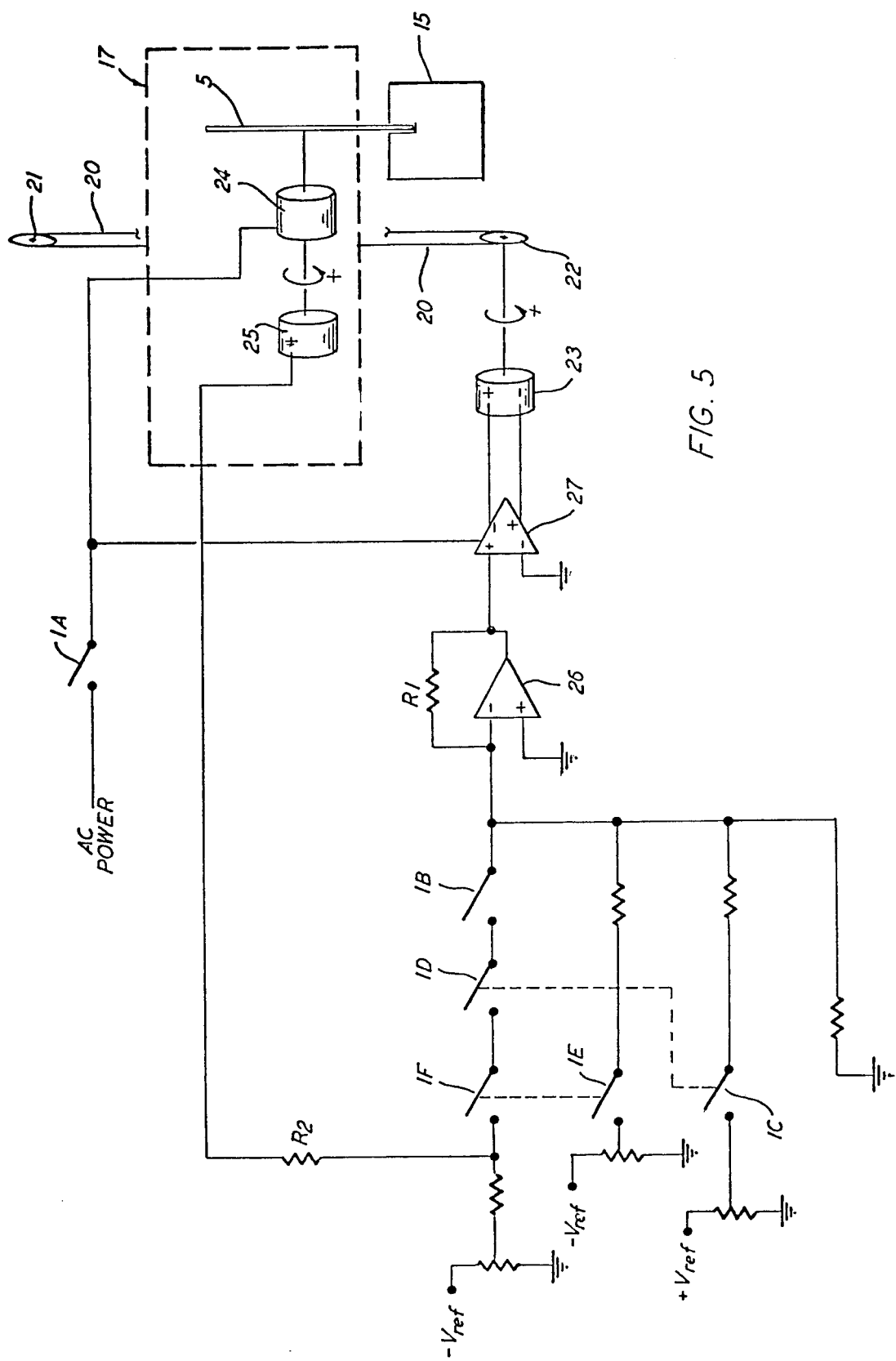
FIG. 5 is a functional schematic of the means for modulation of the progression of the cut and lineal movement of the saw.

FIG. 5 is a functional schematic of means for controlling the rate of progression of the forming tool (a) during the approach to the workpiece; (b) automatic modulation of the progression of the forming operation, and (c) after the forming operation is accomplished to prevent damage to the table cutter or the workpiece. Although this schematic would apply to any modulated forming tool, it will be discussed in connection with the table saw shown generally above.

The electronic portion of the lineal path cutter in this preferred embodiment is comprised of a feed control mode switches (1A, 1B, 1C, 1D, 1E and 1F), a sensor, which in this embodiment is a tachometer (25), which is a DC generator, a lineal feed drive motor (23), summing amplifier (26), and a power amplifier (27). The amplifiers are utilized to reduce the cost, size, and weight of the tachometer-generator. In this preferred embodiment a summing amplifier (26) is necessary to sum a reference signal with the tachometer's signal in the automatic mode, as set forth in more detail below. Also in this preferred embodiment, as shown on FIG. 5, there are three reference voltages shown which are adjustable by potentiometers. These can be derived from any external sources, and conventionally AC power sent through a transformer then rectified. Although the preferred embodiment comprises reference voltages, reference electrical signals of any sort, including but not limited to current, frequency, phase, could be summed with a like signal from the tachometer. Although in the preferred embodiment, a summing amplifier (which does not necessarily amplify or attenuate the voltage) is necessary to add the signals.

In a preferred embodiment of this system, the mode switches (1A, 1B, 1C, 1D, 1E, and 1F) select between manual forward, manual reverse, and automatic forward modes. The manual modes are used when there is no cutter engagement with a workpiece and thus no load on the saw motor (24) provided by a workpiece (15). The manual modes provide a means to move the carriage (17) at a speed lower than the maximum speed of the lineal drive motor (23), thus preventing damage to the saw motor (24), blade (5), and workpiece (15) caused by the blade (5) slamming into the workpiece. The speed in the manual modes is set, in this preferred embodiment, by manual adjustment of potentiometers to select the voltage levels. The output of the power amplifier (27) in the manual feed control modes is, in this preferred embodiment, a DC current fed to the lineal drive motor (23). The drive motor (23) thus responds to the selected voltage levels during the approach and exit of the rotary cutter to and from the cut.

The mode switches can be actuated: (a) by hand (as in this preferred embodiment) or (b) by detection of a maximum saw motor (24) speeds by means of inertial switches or electronic comparators (more fully set forth below in a variant of this preferred embodiment) that sense the tachometer signal levels, or (c) by a switch that detects the proximity of the workpiece (15) during the approach and exit of the cutter (5) to the cut in the workpiece (15). Such a switch is a simple momentary contact switch that touches and is activated by the workpiece (15).

Variants of the preferred embodiment of the modulating drive system are realized by the addition of additional safety switches of the "dead man" type. In other words, the operator is required to hold the buttons down to perform in the manual mode. There are two switches for manually controlled direction of cutter travel, one forward (1E) the other reverse (1C) shown in FIG. 5.

Also, electronic switches can be added at the summing junction of the summing amplifier (26) to function with respect to the speed of the cutter motor (24) to switch forward modes. That is, comparator circuits could be employed to detect upper and lower rotational speed limits of the saw motor as it changes from no load to chip formation by comparing the voltage from the tachometer (25) with the voltage references. The references would equal the output voltages of the tachometer (25) at desired rotational speed limits when switching is to be effectuated.

The tachometer in the preferred embodiment is a DC generator, however as variants thereof, the tachometer (25) may be an optic encoder, Hall effect encoder, or contact encoder. These encoders require an external power source.

The encoders generate pulses as the cutter motor (24) rotates, indicating the amount of rotation. These pulses can be filtered to provide a DC voltage level proportional to the rotational speed of the cutter motor (24). Such filters can be integrating electronic filters. The resulting voltage from any of these encoders which now function as tachometers can then be fed into the summing amplifier (26). Although voltages are summed in the preferred embodiment, electrical signals of any sort, for example, but not limited to pulse, phase or wave amplitude, can be summed in variants of this embodiment.

When the feed control mode switches are in the auto mode, the speed of the tachometer (25) dictates the amount of torque applied by the lineal drive motor (23) to the drive cable (20) in the following manner. The tachometer (25) functions with the output voltage proportional to the speed of the cutter motor (24) which is proportional to the rotational speed of the cutter, in this embodiment, a saw blade. The voltage produced by the tachometer (25) is fed into the summing amplifier (26), which in turn feeds voltage to the power amplifier (27). The power amplifier (27) sends the power to the drive motor (23) and thus the amount of torque delivered to the drive cable (20) is determined. The drive cable (20) imparts the lineal force to the carriage (17) and cutter (5). Thus in the auto mode the net effect is the cutter's (5) rate of lineal motion into the workpiece (15) is increased as the rotational speed of the cutter (5) increases. As the cutter progresses into the workpiece (15), the cutting tips and edges are forced into engagement with the workpiece and the resulting chip formation acts as a brake on the rotational speed of the cutter which in the auto mode results in a lower voltage from tachometer (25) and corresponding decreased lineal motion of the cutter (5).

The minimum rotational speed of the cutter (5) in the automatic mode is selected by adjusting a potentiometer to find the proper reference voltage to be added by the summing amplifier (26) to the tachometer's voltage. After selection, the reference signal remains constant during the forming operation. The proper reference voltage, in this embodiment, is equal in value, but opposite in voltage sign, to the voltage produced by the tachometer (25) at the minimum desired rotational speed of the cutter (5).

In the auto mode, the maximum rotational speed of the saw blade (5), while engaging the workpiece (15) in chip formation, is determined mechanically by the lineal force delivered by the drive motor (23) to the cutter (5) forcing it into the workpiece (15) which causes the rotational speed of the cutter (5) to slow. Electronically that mechanical process is effectuated by the following factors: by the gain of the power amplifier (27), the gain of the summing amplifier (26), and the voltage to speed ratio of the tachometer (25). A higher gain in either the summing amplifier (26) or the power amplifier (27) will result in more torque being applied by drive motor (23) which in turn causes more lineal force to be delivered to the carriage (17) and cutter (5). The same is true of a higher voltage to speed ratio of the tachometer (25).

The feed control mode switches: 1A, main power switch AC; 1B, automatic mode button—normally open contact; 1C, manual reverse switch button—normally open contact; 1D, manual reverse button—normally closed contact; 1E, manual forward button—normally open contact; 1F, manual forward button—normally closed contact, are all shown on FIG. 5.

When the operator wishes to actuate the machine, the main power switch (1A) is turned on causing power to go to the saw motor (24) and causes blade (5) to turn. Also, the main power switch sends voltage to the power amplifier (27). However, no current goes to lineal drive motor (23) because the zero signal is going to the summing amplifier (26). When manual forward button (1E) is closed (which opens switch 1F), the minus reference signal is fed to the summing amplifier (26) which inverts the signal and feeds it to the power amplifier (27), thus controlling the manual forward speed of the carriage (17). This the operator will do as the cutter (5) approaches the workpiece (15).

When the cutter (5) is about to enter the workpiece (15), the operator releases the manual forward button (1E) (which closes 1F) and then the operator depresses the automatic mode button (1B) which causes the tachometer's (25) voltage to be fed into the summing amplifier (26) which results in modulated chip formation as the cutter makes its cut through the workpiece (15).

When the cutter passes through its cut in workpiece (15), the operator releases the automatic mode button (1B) which stops the drive motor and then depresses the manual reverse button (1C) (which opens 1D) which applies a positive reference to the summing amplifier (26) which inverts the voltage to the power amplifier (27) and causes the drive motor (23) to cause the carriage (17) to travel in a reverse direction.

The parts of the drive control mechanism are comprised of the feed control mode switches (1A, 1B, 1C, 1D, 1E, and 1F), the tachometer (25), drive motor (23), pulleys (21) and (22), cable (20), summing amplifier (26) and power amplifier (27) thus cooperate to prevent damage to the cutting machine and workpiece. During the approach of the cutter (5) to the workpiece (15), the lineal progression of the cutting apparatus does not exceed a selected maximum rate, preventing damage to the lineal drive mechanism. Furthermore, the cutter (5) is eased into engagement with the workpiece so that saw motor (24) does not stall because cutter (5) is slammed into workpiece (15), biting into the workpiece (15), nor is there impact damage to the ways (7) or bushings (16). During the progression of the cut in the auto mode, the chip formation is modulated to be efficient and to prevent unnecessary damage to the workpiece (15).

Figure 6:
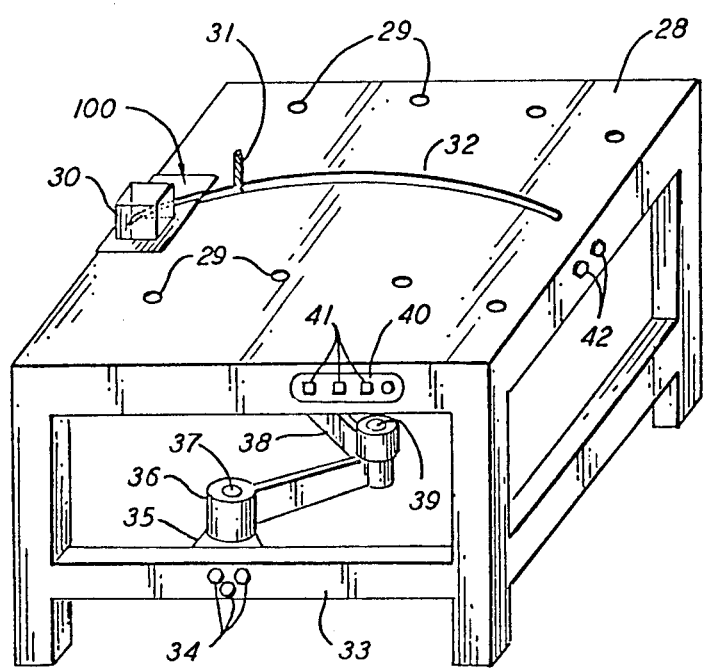
FIG. 6 is a perspective view of another preferred embodiment, a table router.

FIG. 6 shows another preferred embodiment of a modulated lineal path table cutter, an air driven router that performs in a lineal path which in this embodiment is an arc. The router bit (31) makes an arcing cut by traveling through slot (32) in table (28) that has holes (29) through the table to accept hold down clamps shown in FIG. 2. The router bit is shielded by a clear plastic guard (30) while permitting the router bit (31) to reach operating speed. The guard (30) is open sided to slot (32). The guard is hinged (not shown) in a similar fashion as was the table saw described above to permit the removal of plate (100) for changing of bit. Although the router can be slaved to a lineal way, in this preferred embodiment, the router motor (not shown in FIG. 6, but illustrated in FIG. 7) is mounted to an articulating arm partially shown in FIG. 6 for added stability while making the cut. The arm is mounted to a lateral frame member (33) on a mounting boss (35) bolted to the frame member (33) by bolts (34). The upper arm (36) of the articulating arm pivots on shoulder pin (37) on the mounting boss (35) and the lower arm (38) pivots on the elbow pin (39). The router is guided by an arcing lineal way (not shown in FIG. 6, but illustrated in FIG. 7) that is bolted to the table (28) by bolts (42). The router is controlled by a control panel (40) with switches (41) and by an operator positioned away from the lineal path of the cut.

Figure 7:
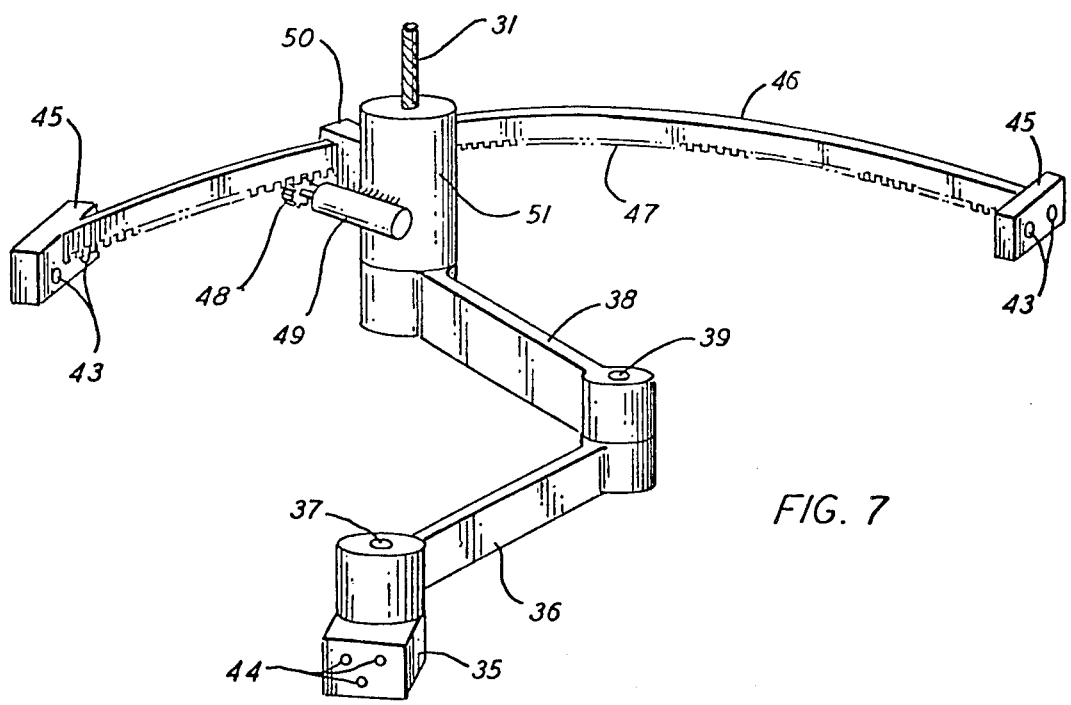
FIG. 7 is a fragmentary perspective view, wherein various portions are cut away to facilitate disclosure, indicating the router mounted on an articulating arm and slaved to an arcing lineal way.

FIG. 7 is a view of the router with table (28) cut away for illustrative purposes. The lineal way, in this preferred embodiment, is comprised of an arcing rectangular way (46) with teeth (47) on the bottom side with attached mounting blocks (45) with holes (43) to accept bolts (42). The router motor (51) that rotates router bit (31) is mounted so that it will pivot at the wrist of lower arm (38) of the articulating arm which is mounted to the table (28) by bolts (34) which pass through holes (44) in the mounting boss (35).

In this preferred embodiment, the drive motor (49) is mounted on the router motor's (51) housing and drive gear (48) engage teeth (47) of the arcing lineal way (46). The router motor (51) is slaved to lineal way (46) by conventional roller bearing bushings (not shown) contained in housing (50) attached to the housing of the router motor (51). Means of controlling lineal progression of the router is described above in the table saw embodiment. A variant of this embodiment would have the table top circular in shape and have the router mounted in the stationary manner. The variant would operate the same as the embodiment shown in FIG. 8, however, the table top would be rotated by the feed drive motor.

While FIG. 6 showed the tachometer (25) mounted on the shaft of cutter motor (24) and the cutter (5) mounted on the cutter motor's (24) shaft, the cutter (5) may be mounted on a separate arbor with means of power transmission from the cutter motor (24) to the cutter's (5) arbor. In such instance, the tachometer may be mounted on the cutter motor (24), the cutter's arbor, or taken off at some other point of the means of power transmission.

Figure 8:
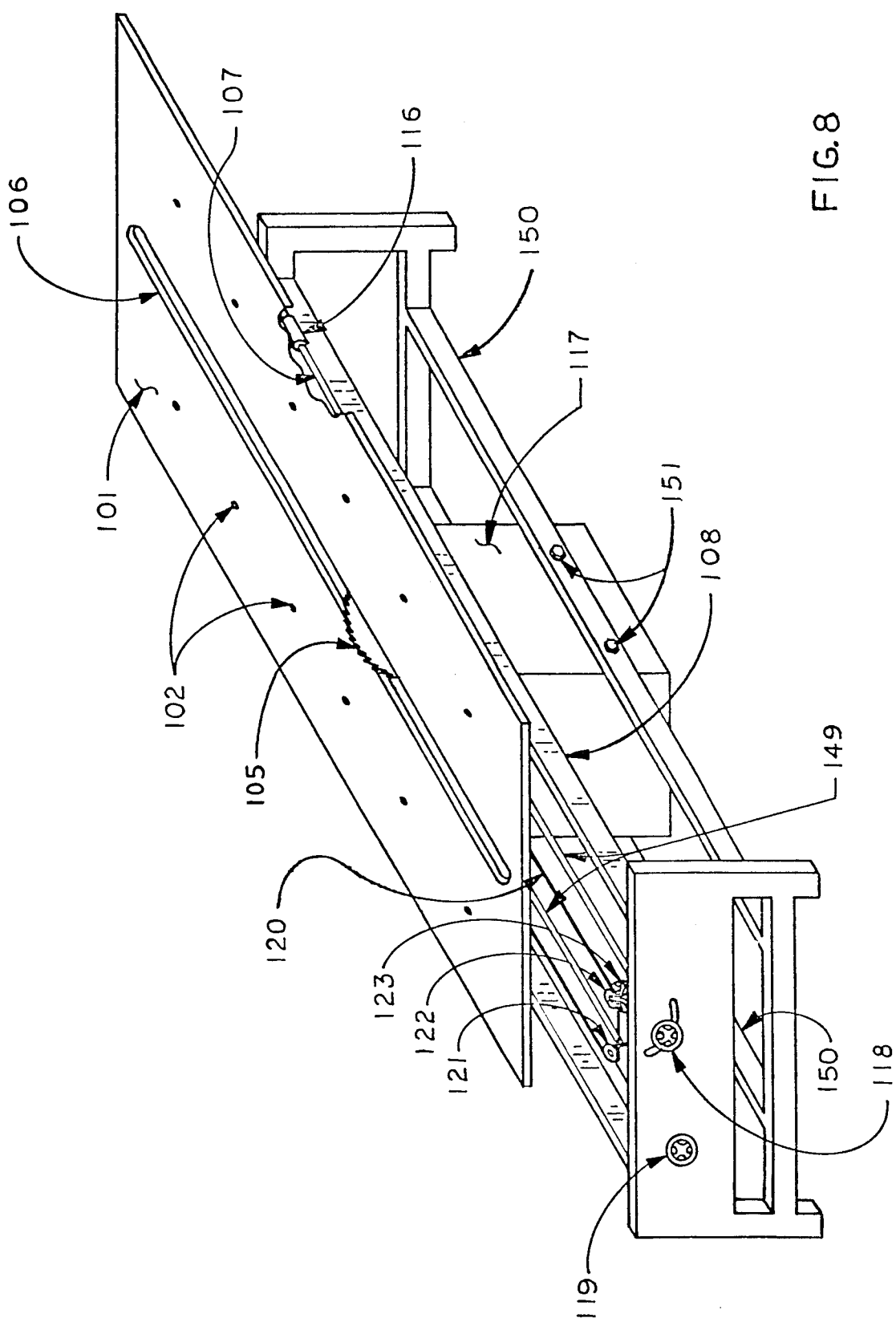
FIG. 8 is a fragmentary perspective view, wherein various portions are broken away to facilitate disclosure, indicating a table slaved to lineal ways by linear ball bushings and a stationary saw.

FIG. 8 shows a workholder comprised of a table (101) and clamps (not shown) that protrude through holes (102) arrayed in the table top (101), said workholder being driven by cable (120) that passes over three idler pulleys (121) (only one shown) and a drive pulley (122) mounted on the drive motor (123). The cable (120) is attached to the underside of table top (101) by means not shown. The saw is mounted in the stationary enclosure (117) attached to table frame by bolts (151) to members (150) and blade (105) is adjustable by conventional means (not shown) for height and tilt by manually turning wheels (118) and (119) which are connected by shafts (149) to the means of adjustment. Saw blade (105) passes through slot (106) in the table top (101) to cut the workpiece.

The table top (101) is mounted on linear ball bushings (116) which partially encircle cylindrical ways (107). Only one linear ball bushing (116) is shown in FIG. 8 where table top (101) is broken away. The ways (107) are supported on V-cut rails (108) to provide accurate guide action for the moving workholder as it is being driven by drive motor (123) through cable (120) which is attached to the moveable table top (101). In operation, this embodiment works much as does the saw shown in FIG. 1, however the table top (101) and clamps (not shown) hold the workpiece (not shown) and thus the workpiece is driven into a saw blade (105), which, after height and tilt adjustment, is maintained in the same relative position as it rotates. A variant of this embodiment would have the table top (101) mounted on a lineal way and an articulating arm similar as shown on FIG. 6 above except the lineal way would be straight. Another variant of this embodiment would have the table top circular in shape and have the saw mounted in a stationary manner. This variant would operate much the same as the embodiment shown in FIG. 8, however the table top would be rotated by the feed drive motor. No switches for control are shown, but could be mounted on a panel on the saw's framework in a similar manner as was shown on FIG. 1.

Figure 9:
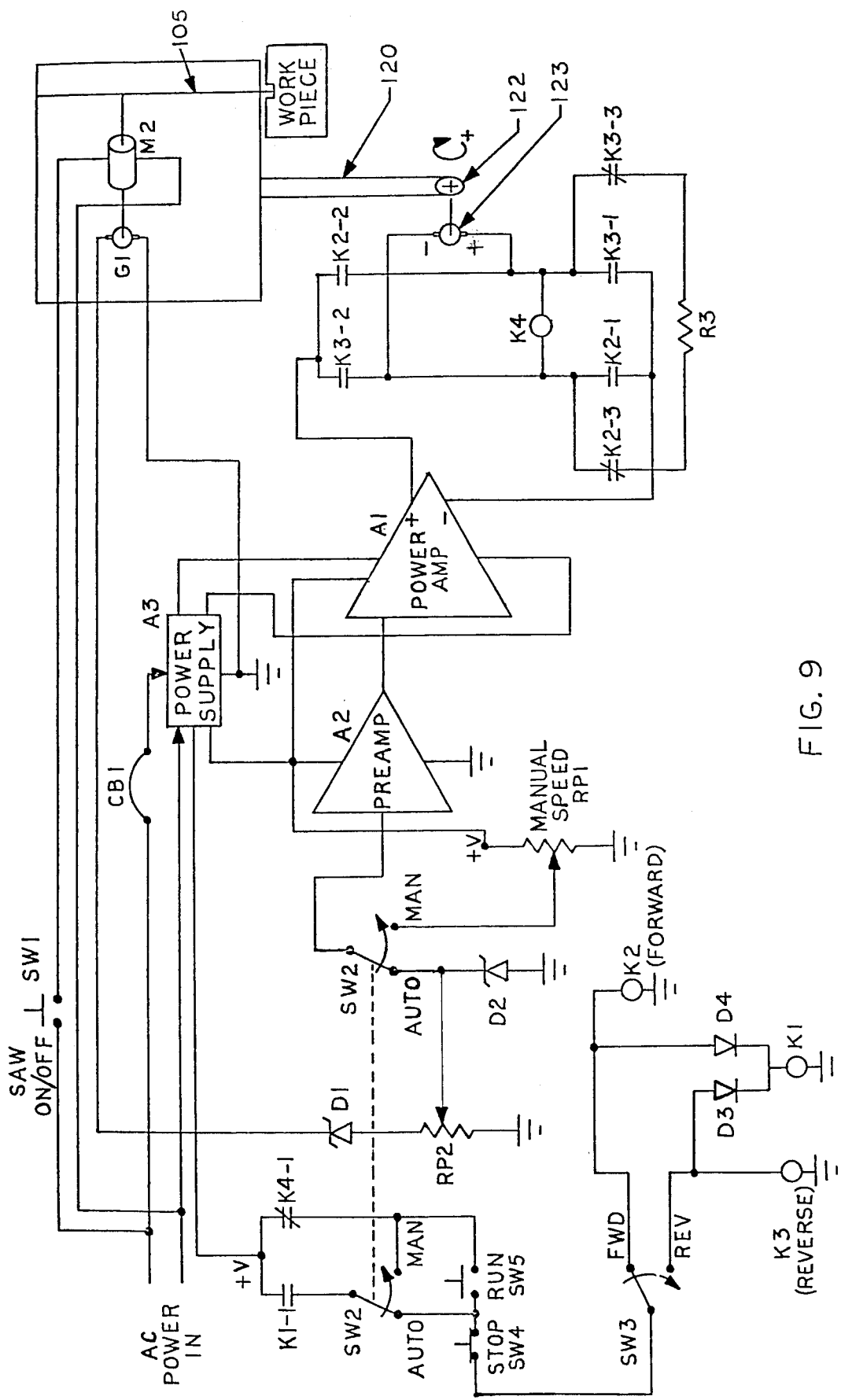
FIG. 9 is a functional schematic of the means for modulation of the progression of the forming operation and automatic control of the lineal movement of the workholder.

FIG. 9 shows another preferred embodiment of the electronic means for modulation of the progression of the cut or other forming operations and control of the lineal movement of the workholder or forming tool. This means of control is adaptable for any of the variants and embodiments of this invention.

The electrical portion of this variant of the lineal path cutter is comprised of amplifiers A1 and A2; power supply A3; circuit breaker CB1; zener diodes D1 and D2; diodes D3 and D4; generator G1; relays K1, K2, K3 and K4; drive motor (123); cutter motor M2; potentiometers RP1 and RP2; resistor R3 and switches SW1, SW2, SW3, SW4 and SW5. AC power is supplied to the saw motor M1 by closing switch SW1 (a double pole double throw switch shown on FIG. 9 with a dashed line between poles.) AC power is also supplied to the power supply A3 by closing circuit break CB1.

The power supply A3 provides a DC voltage to relay contacts K1-4, K4-1, preamplifier A2; power amplifier A1; and potentiometer RP1. The power supply A3 also provides high power in the form of AC or DC (depending on power amplifier design) to the power amplifier A1.

This variant of the lineal path cutter functions in 3 modes set by switches SW2, SW4 and SW5. Further, two of the modes can be amplified by the forward-/reverse switch SW3.

The mode discussed is the STOP mode set by SW4. The stop mode is achieved by depressing the stop button SW4. During this mode, relays K1, K2 and K3 are not energized. Relay contacts K2-1, K3-1, and K3-2 are open, thus the drive motor (123) receives no power. In addition, relay contacts K2-3 and K3-3 are closed which ties R3 across the drive motor (123) to achieve dynamic braking if motor (23) happens to be turning. The STOP mode can be achieved regardless of the positions of switches SW1, SW2 and SW3.

The second mode discussed in the MANUAL mode. This mode is used to advance drive motor (123) in the forward and reverse directions without control of generator G1. The manual mode is effectuated by setting switch SW2 to the MAN position. This mode is enabled by depressing the run button SW5. Current flows through relay contact K4-1 and switches SW4 and SW5 to ultimately energize relays both K1 and K2 or both K1 and K3. Relay contact K4-1 will remain closed unless drive motor (123) begins generating too much back voltage. This protects the power amplifier A1 by de-energizing relays K1, K2, and K3 which disconnects the drive motor (123) from the power amplifier A1.

When run button SW5 is depressed, switch SW2 in the MAN position, relay contact K4-1 is closed, and SW3 is in the forward position, then relay K2 is energized and relay K1 is energized through diode D4. Relay contacts K2-1 and K2-2 close and connect the power amplifier across the drive motor (123) with positive polarity. Relay contact K1-1 is closed to maintain relays K2 and K1 in the energized state. The preamplifier input has a DC voltage supplied to it through the manual speed potentiometer RP1. The manual speed is adjusted with RP1. The pre-amplifier A2 transmits a conditioned signal to the power amplifier A1. The power amplifier A1 boosts the power of the conditioned signal and transmit it to the drive motor (123) in a positive polarity due to relay contacts K2-2 and K2-1 being closed. This causes drive motor (123) to rotate in a positive direction. If SW3 was in the reverse position in the manual mode, the circuit would function exactly the same as mentioned herein except relay K3 would be energized instead of relay K2. This would close relay contacts K3-1 and K3-2 polarizing the power amplifier A1 output to the drive motor (123) in a negative polarity. The drive motor (123) would rotate in a negative direction at the rate determined by the manual speed potentiometer RP1.

The third mode discussed is the AUTO mode. The auto mode is effectuated by setting SW2 to the auto position. The auto mode functions exactly the same way as the manual mode except for two differences. The first difference is the source of the signal to the preamp A2. The signal to the preamp A2 ultimately begins at generator G1. Generator G1 derives its signal by the turning motion of the saw arbor (in this functional schematic simply shown to be a continuation of shaft of motor M2.) The output voltage of generator G1 is proportional to its rotational speed. Zener diode D1 prevents the output signal of the generator G1 from reaching the pre-amplifier A2 unless the generator level is greater than the zener breakdown voltage of zener D1. The value of the zener breakdown voltage is selected to be equal to the voltage of generator G1 at the minimum desired saw arbor speed. The output of generator G1 is further reduced by potentiometer RP2. Potentiometer RP2 provides a means for the operator to adjust loop gain. Potentiometer RP2 is adjusted to a point where the drive motor (123) does not jerk through a rotation but instead smoothly rotates. Zener diode D2 limits the maximum value of the signal that the preamplifier A2 receives from the wiper of potentiometer RP2. The modified generator signal is amplified by the pre-amplifier A2 and further amplified by the power amplifier A1. Relay contacts K2-1, K2-2, K3-1 and K3-2 feed the power amplifier A1 to the drive motor (123) in the same fashion as in the manual mode. If switch SW3 is in the forward position, relay contacts K2-2 and K2-1 will be closed and the drive motor (123) will be energized with positive polarity causing drive motor (123) to rotate in the positive direction. If switch SW3 is in the reverse position, relay contacts K3-1 and K3-2 will be closed and the drive motor (123) will be energized with negative polarity causing drive motor (123) to rotate in the negative direction. This particular variant's electrical portion also provides negative auto mode, i.e., auto mode with negative polarity causing drive motor (123) to rotate in the negative direction, and consequently, modulates the progression of the forming operation when the operation is made in the reverse direction.

The modulation of the progression of forming operation is performed as it was described above. Maintenance of efficient forming operation is accomplished by: increasing the rate of lineal progression of the forming operation, if necessary, to maintain forming motion of the tool at a speed in the optimal range to prevent skating, frictional heat and damage to the tool or workpiece and decreasing the rate of lineal progression of the forming operation, if necessary, to maintain speed of the forming motion of the tool in an optimum range to assure efficient forming and minimize the size of the tool motor needed to perform undamaged formed surfaces and prevent damage to the forming machine.

This invention would also find application when any machining operation forms a workpiece wherein the forming tool's motion is linear or in part linear, including but not limited to forming tools such as reciprocating saws, powered shears, powered hammers, reciprocating chisels, if mechanical of electrical means are employed to generate electrical signals functionally proportional to the forming motion, e.g. piezo sensors, optic sensors, magnetic sensors, Hall effect transistors and magnets, or any other motion sensors. (Also mechanical or electric means can be used to convert the linear forming motion to a rotary motion that can be measured by a tachometer.) The sensor would, as in the above described embodiments, transmit a signal to control a drive motor that would bring the tool and workpiece into contact to permit the forming motion of the tool to form the workpiece. The sensor would sense the mechanical resistance of that portion of the workpiece being worked to the forming operation and the signal generated by the sensor would modulate the progression of the forming operation of the workpiece, keeping the forming motion of the tool within optimal range given the conditions the forming tool then encounters in the workpiece, thus assuring efficiency. Any machining operation that forms a workpiece whether by hammering, sawing, milling, routing, cutting, or drilling, chip formation or not, can be modulated if there is resistance met by the forming tool during the forming operation and the sensor, by detection of variances of speed of the forming motion of the tool, can sense the resistance of that portion of the workpiece being worked on to the forming operation.

Depending on the type of signal generated by the immediately above mentioned sensor, further conditioners of that signal or amplifiers conforming to the input of the signal may be utilized (as this art is conventional, it is not further described.)

This invention applies to where the forming operation follows any lineal path. For example, a sensor (in this case a tachometer) could be mounted on a milling bit arbor that rotates in a stationary position and the signal control the rate of rotation of a rotating workholder to perform an arcing milling operation on metal workpieces that are revolved into the milling bit. Furthermore, this invention finds application for modulating forming operations that are performed in a numerically controlled path on the workpiece, even where the path is made up of short lineal segments, such as a series of spaced holes being drilled in a workpiece.

Several embodiments of the principals of this invention have been described in detail and it will appear to those skilled in the art that details of one of the embodiments may be transferred to the other embodiments with the exercise of mechanical and electrical skill, and that various modifications in the several structures may be made within the spirit and scope of my invention, which is not to be considered as limited otherwise than in the appended claims.

I claim:

1. A material forming machine comprising a forming tool, driven by a forming tool motor, a workpiece, a feed drive motor, sensing means which generate a electrical signal which is proportional to the rotational speed of the forming tool motor, a constant reference signal greater than zero and equal in magnitude, but opposite in sign to the signal produced by the sensing means at the minimum desired rotational speed of the forming tool motor, and a summing amplifier to combine the signal from the sensing means with the reference signal to vary the speed of the feed drive motor in response to variations in the speed of the forming tool motor.

2. A material forming machine according to claim 1 wherein the sensing means is a direct current generator.

3. A material forming machine according to claim 1 wherein the sensing means is an optic encoder.

4. A material forming machine according to claim 1 wherein the sensing means is a hall effect encoder.

5. A material forming machine according to claim 1 wherein the summing amplifier is a diode.

6. A material forming machine according to claim 1 wherein the summing amplifier is a zener diode.

* * * * *